March 10, 1931. E. R. ANDERS 1,795,535
TEA AND LIKE INFUSER
Filed Feb. 29, 1928
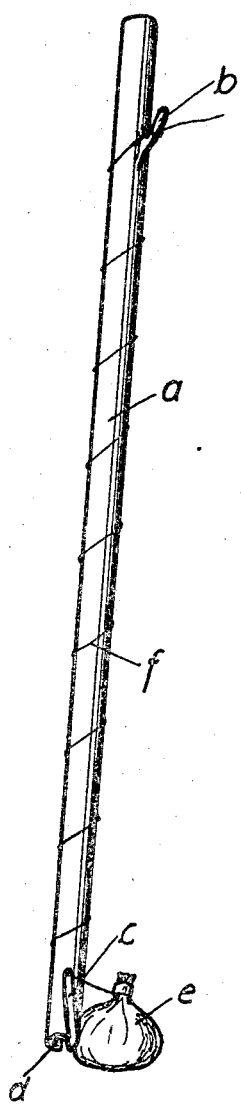
Inventor:
Ernst Rudolf Anders.

Patented Mar. 10, 1931

1,795,535

UNITED STATES PATENT OFFICE

ERNST RUDOLF ANDERS, OF DRESDEN-BLASEWITZ, GERMANY

TEA AND LIKE INFUSER

Application filed February 29, 1928, Serial No. 258,109, and in Germany January 22, 1928.

Tea, ground coffee and similar substances are often supplied in gauze bags which are filled and packed mechanically and subsequently employed together with a holder as infusers in the preparation of the beverage, the substances being proportioned in the bags to meet different requirements.

The object of the present invention is to produce a simple and serviceable holder for use with infusers of this kind, and the invention consists in the provision of a tube or rod of insoluble and tasteless material having at one end a slit for the reception of the tying string of the bag and at the other end a laterally disposed hook to which the string can be fastened.

The invention is illustrated in the accompanying drawing which shows the holder connected to the bag and ready for use.

The holder is made of any suitable, insoluble and tasteless material, such as glass or the like, and consists of a straight stick or rod $a$ having at one end a slit $c$ and at the other end a laterally disposed hook $b$. The gauze bag $e$ containing the substance to be infused, is tied with a string $f$ long enough to be attached to the holder. The string is first inserted into the slit $c$, then preferably wound about the holder as shown, and finally fastened to the hook $b$. The slit $c$ is carried a sufficient distance up the holder to leave the end $d$ of the latter free for stirring the liquid.

The holder may be made hollow and tubular so that it can, if desired, function as a drinking straw.

I claim:

1. A holder for tea and like infusing bags comprising a straight rod having at one end a slit and at the other end a laterally disposed hook.

2. A holder for tea and like infusing bags comprising a straight tubular rod having at one end a slit and at the other end a laterally disposed hook.

3. A holder for tea and like infusing bags comprising a straight glass rod having at one end a slit and at the other end a laterally disposed hook.

ERNST RUDOLF ANDERS.